(12) United States Patent
Masudaya

(10) Patent No.: US 6,877,370 B2
(45) Date of Patent: Apr. 12, 2005

(54) TIRE AIR PRESSURE MONITOR

(75) Inventor: Hideki Masudaya, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 14 days.

(21) Appl. No.: 10/682,495

(22) Filed: Oct. 9, 2003

(65) Prior Publication Data

US 2004/0069058 A1 Apr. 15, 2004

(30) Foreign Application Priority Data

Oct. 15, 2002 (JP) .......................... 2002-300444

(51) Int. Cl.$^7$ .......................................... G01M 17/02
(52) U.S. Cl. ........................................ 73/146; 340/442
(58) Field of Search ............................. 73/146–146.8; 340/440–447

(56) References Cited

U.S. PATENT DOCUMENTS

| | | | |
|---|---|---|---|
| 5,924,055 A | | 7/1999 | Hattori |
| 6,062,072 A | * | 5/2000 | Mock et al. ............... 73/146.5 |
| 6,271,748 B1 | * | 8/2001 | Derbyshire et al. ......... 340/442 |
| 6,463,799 B1 | | 10/2002 | Oldenettel et al. |
| 6,545,599 B2 | * | 4/2003 | Derbyshire et al. ......... 340/442 |
| 6,591,671 B2 | * | 7/2003 | Brown ....................... 73/146.5 |

FOREIGN PATENT DOCUMENTS

JP   2538986   4/1997

* cited by examiner

Primary Examiner—Edward Lefkowitz
Assistant Examiner—Jermaine Jenkins
(74) Attorney, Agent, or Firm—Brinks Hofer Gilson & Lione

(57) ABSTRACT

A tire air pressure monitor includes tire air pressure sensors and transmitters proximate to tires; receiving antennas which receive transmitting signals from the transmitters; phase shifters which shift signal phases received from the antennas by control voltages; a synthesizer which synthesizes outputs from the phase shifters; and a meter which detects an output level from the synthesizer. The phase differences between the antennas are different and the control voltages for the phase shifters are obtained in advance, which maximizes the output level from the synthesizer dependent on the tire mounting positions. An association table relates the tire mounting positions to the control voltages and the control voltages are controlled so that the output level from the synthesizer is maximized with respect to a transmitting signal from any one of the tire mounting positions. The tire mounting positions is identified by comparing values of the control voltages thus controlled.

2 Claims, 14 Drawing Sheets

EXAMPLE OF ANTENNA ARRANGEMENT
ON VEHICLE

EXAMPLE OF ANTENNA ARRANGEMENT ON VEHICLE

BLOCK DIAGRAM

FIG. 3
EXAMPLES OF PHASE SHIFTER
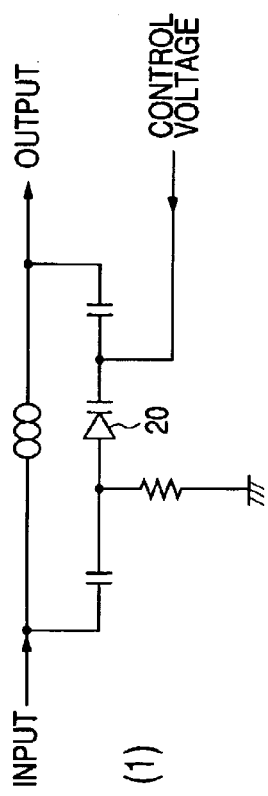
(1)
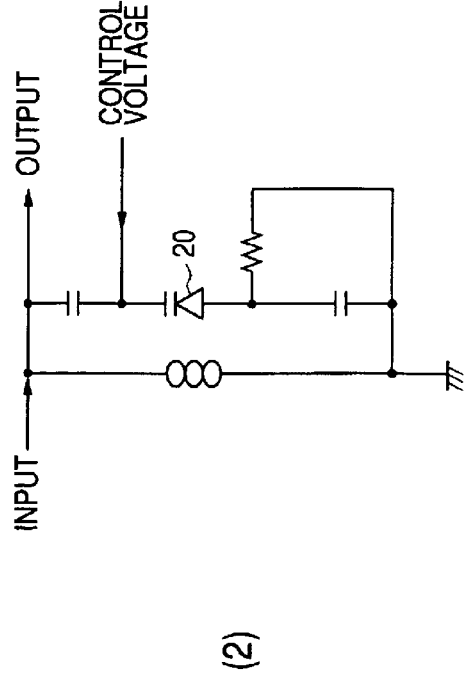
(2)
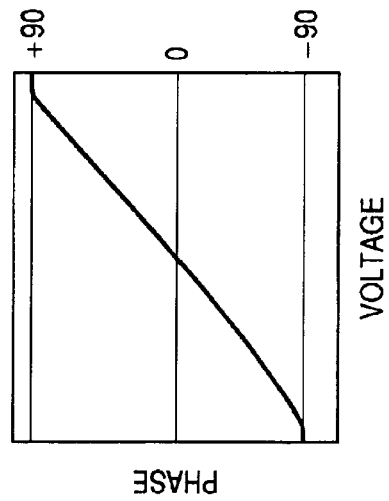
(3)

SIGNAL TRANSMISSION FROM POSITION T1

SIGNAL TRANSMISSION FROM POSITION T4

FIG. 14

| TIRE MOUNTING POSITION | PHASE DIFFERENCE (1)-(2) | CONTROL VOLTAGE 1 | CONTROL VOLTAGE 2 |
|---|---|---|---|
| T1 | + LARGE | + LARGE | SMALL |
| T2 | SMALL | SMALL | SMALL |
| T3 | + MEDIUM | SMALL | + MEDIUM |
| T4 | − LARGE | SMALL | + LARGE |

TIRE AIR PRESSURE MONITOR

BACKGROUND OF THE INVENTION

1. Field of the Invention

The present invention relates to an apparatus for monitoring air pressure of a plurality of tires, which are mounted on a vehicle. More particularly, it relates to a tire air pressure monitor which is capable of identifying a position where each of the tires is mounted.

2. Description of the Related Art

In conventional arts, there have been suggested the following methods for transmitting a tire air pressure signal, in particular, a signal including an air pressure abnormality, from a transmitting antenna installed on each tire, and for making a notice as to the tire air pressure via a receiving antenna, which is installed in the vicinity of a tire:

(1) receiving antennas are placed respectively in the vicinity of tires to detect from which receiving antenna a signal is received, so as to determine from which tire a signal is transmitted (e.g., see Patent Reference 1);
(2) one receiving antenna is placed in the vicinity of a plurality of tires, transmission antennas are provided facing to the respective tires, an ID is given by tire, and the tire is identified by confirming the ID via a two-way communication between the transmitting side and the receiving side; and
(3) one receiving antenna is placed in the vicinity of a plurality of tires, a signal from a transmitting antenna for each tire is provided with an ID by tire, and a tire is identified based on the ID in a received signal via one-way communication from the transmission side (e.g., see Patent Reference 2).

[Patent Reference 1]
Japanese Registered Utility Model No. 2538986
[Patent Reference 2]
U.S. Pat. No. 5,924,055

According to the method as described in (1) above, it is necessary to install receiving antennas for the respective tires, and it is also required to determine from which receiving antenna a signal is received at the receiving side, thereby making the air pressure monitor more complex. According to the method as described in (2) above, a configuration for carrying out the two-way communication (e.g., a transmitting antenna facing to each tire) is necessary, thereby making the system more complex. Further, according to the method as described in (3), exchanging tires in rotation may cause an inconvenience such that it becomes impossible to determine which tire is mounted in which position.

SUMMARY OF THE INVENTION

An objective of the present invention relates to monitoring air pressure of a plurality of tires mounted on a vehicle, and provides a monitor whose entire configuration is simplified and which is capable of identifying a mounting position of a tire.

In order to solve the problems above, the present invention employs the following configuration:

A tire air pressure monitor comprising:

tire air pressure sensors and transmitters which are respectively annexed to tires mounted on a vehicle;

two receiving antennas which receive a transmitting signal from each of the transmitters;

phase shifters which shift signal phases received from the receiving antennas respectively by control voltage;

a synthesizer which synthesizes outputs from the phase shifters; and a meter which detects an output level from the synthesizer, wherein, the two receiving antennas are arranged so that receiving phase differences between the two receiving antennas as to the transmitting signal from each of the transmitters are made different, the control voltages for the phase shifters are respectively obtained in advance, which maximize the output level from the synthesizer, as to respective tire mounting positions provided with the transmitters to store an association table relating each of the tire mounting positions to the control voltages, and the control voltages are controlled so that the output level from the synthesizer is maximized with respect to a transmitting signal from any one of the tire mounting positions to identify each of the tire mounting positions by comparing values of the control voltage thus controlled with the association table.

Another configuration is:

A tire air pressure monitor comprising:

tire air pressure sensors and transmitters which are respectively annexed to tires mounted on a vehicle;

two receiving antennas which receive a transmitting signal from each of the transmitters;

phase shifters which shift signal phases received from the receiving antennas respectively by control voltages;

a synthesizer which synthesizes outputs from the phase shifters; and a meter which detects an output level from the synthesizer, wherein, the two receiving antennas are arranged so that receiving phase differences between the two receiving antennas as to the transmitting signal from each of the transmitters are made different, the control voltages for the phase shifters are respectively obtained in advance and stored, which maximize the output level from the synthesizer, as to respective tire mounting positions provided with the transmitters, and the control voltages stored respectively for the tire mounting positions are applied to a transmitting signal from any one of the tire mounting positions, so as to obtain the output level from the synthesizer and to detect a degree of the level, whereby the tire mounting position is identified.

According to the configurations as described above, it is possible to provide a tire air pressure monitor with such a simple structure as installing two receiving antennas and one-way communication, and further it is also possible to identify the tire mounting position.

BRIEF DESCRIPTION OF DRAWINGS

FIGS. 3A, 3B, 3C are diagrams showing specific examples of phase shifters in the circuitry for identifying the tire mounting position;

FIG. 14 is a table which shows for each tire mounting position, a phase difference between the signals inputted to the two receiving antennas and a level of control voltages to maximize a synthesized output.

DETAILED DESCRIPTION OF THE PREFERRED EMBODIMENTS

Figure 1:
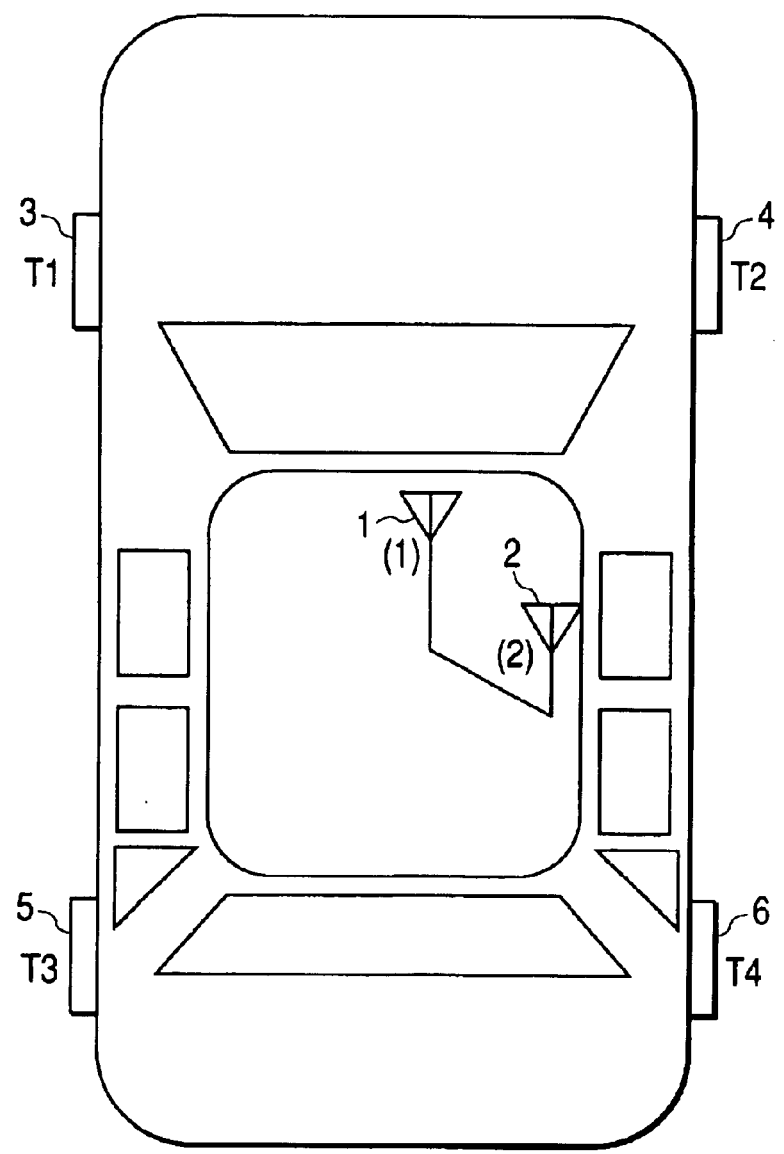
FIG. 1 is an illustration showing an example of arrangement and its configuration of sensors and transmitters respectively annexed to tires and two receiving antennas, in a tire air pressure monitor relating to an embodiment of the present invention.
Figure 2:
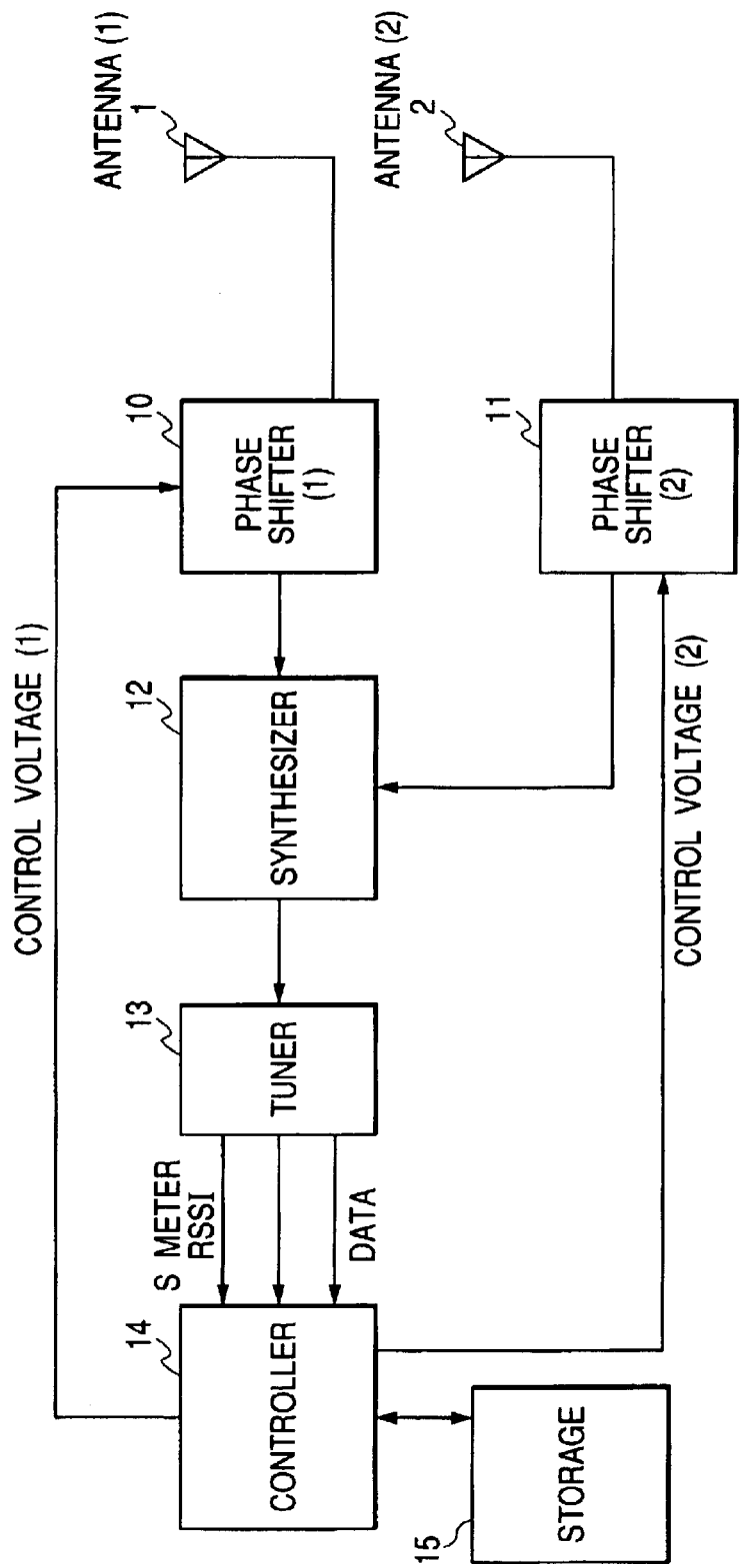
FIG. 2 is a diagram showing a circuitry for identifying a mounting position of a tire, relating to the embodiment of the present invention.

Hereinafter, a tire air pressure monitor relating to a preferred embodiment of the present invention will be described referring to the attached drawings. FIG. 1 is an illustration showing an arrangement and its configuration of sensors and transmitters respectively annexed to tires and two receiving antennas, in a tire air pressure monitor relating to an embodiment of the present invention. FIG. 2 is a diagram showing a circuitry for identifying a mounting position of a tire, relating to the embodiment of the present invention. FIGS. 3A, 3B, 3C are diagrams showing specific examples of phase shifters in the circuitry for identifying the tire mounting position.

Figure 4:
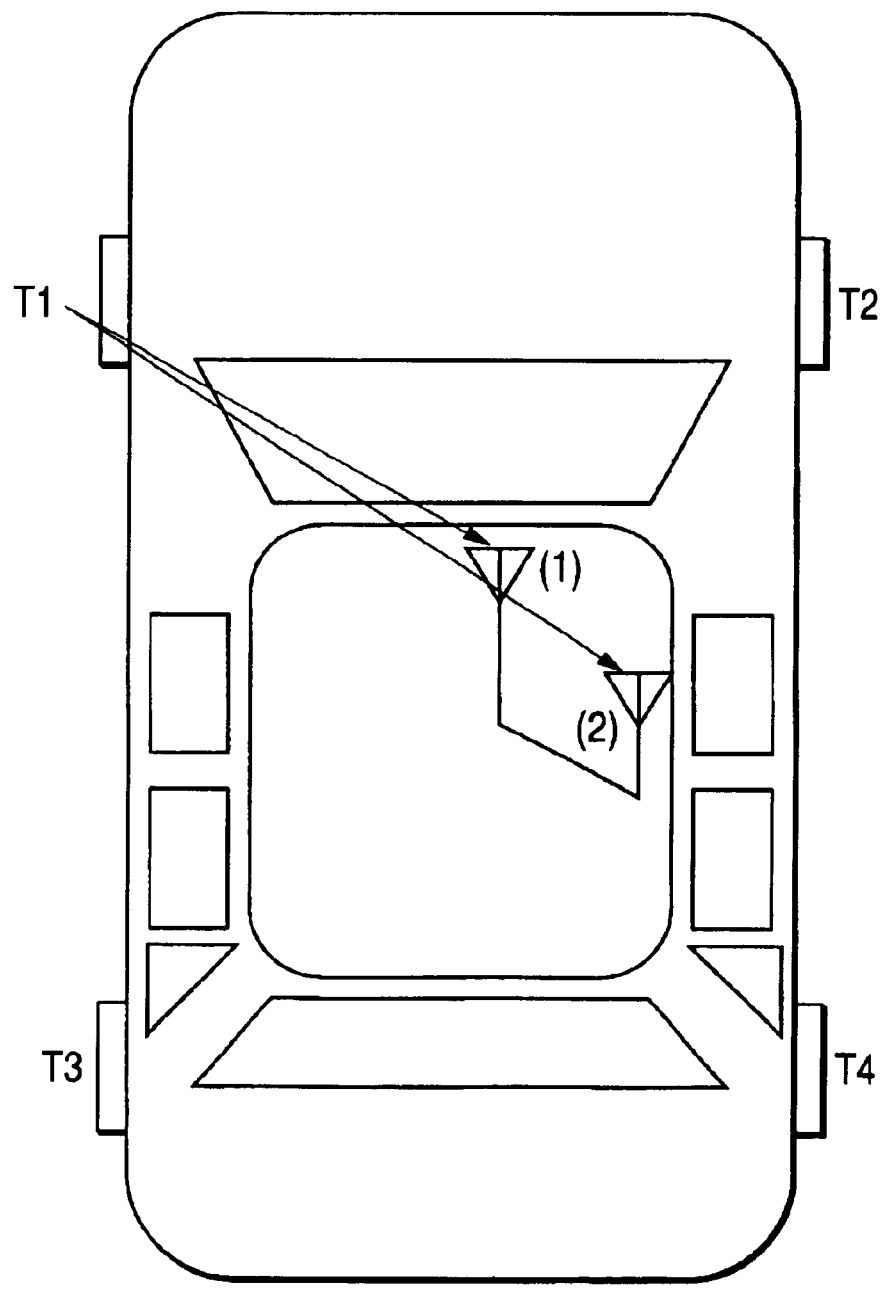
FIG. 4 is an illustration showing a receiving status when the two receiving antennas receive transmitting signals from the tire mounting position T1.
Figure 5:
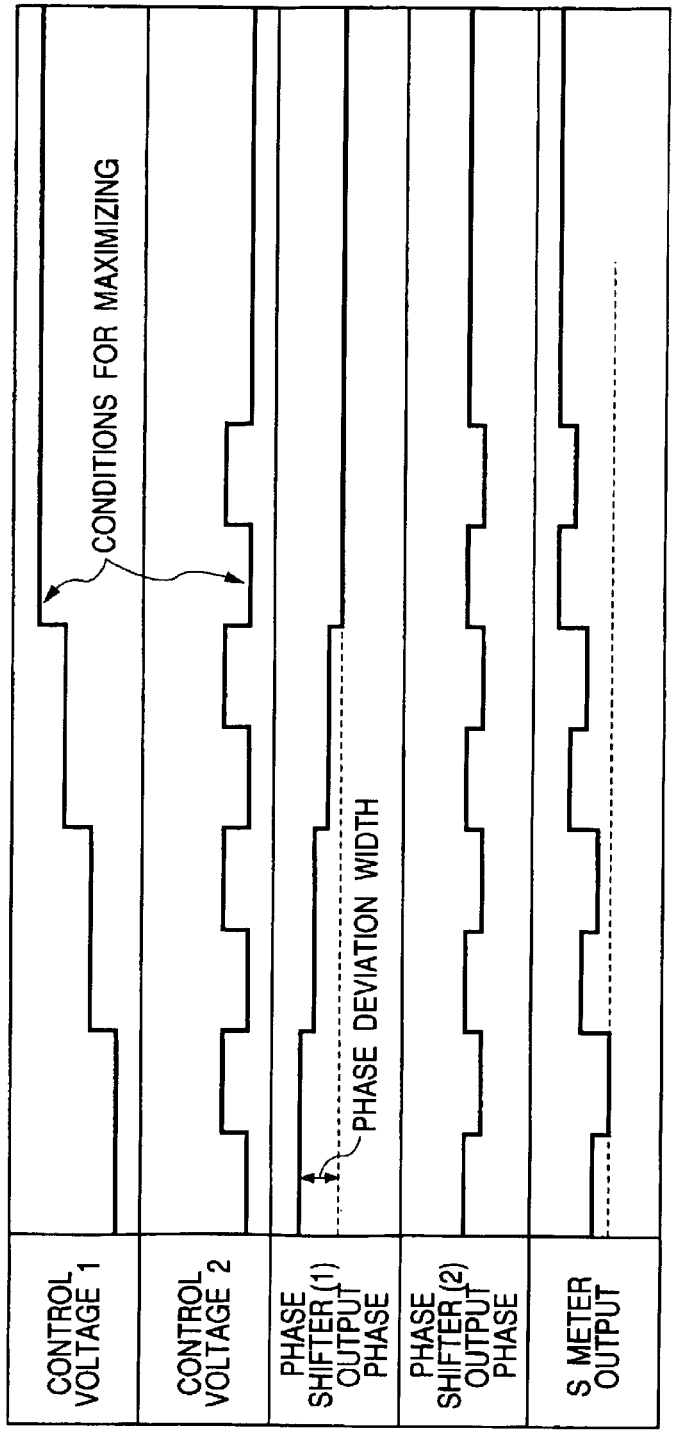
FIG. 5 is a diagram showing signal waveforms of a circuitry for identifying a tire mounting position in the case of signal transmission from the tire mounting position T1.
Figure 6:
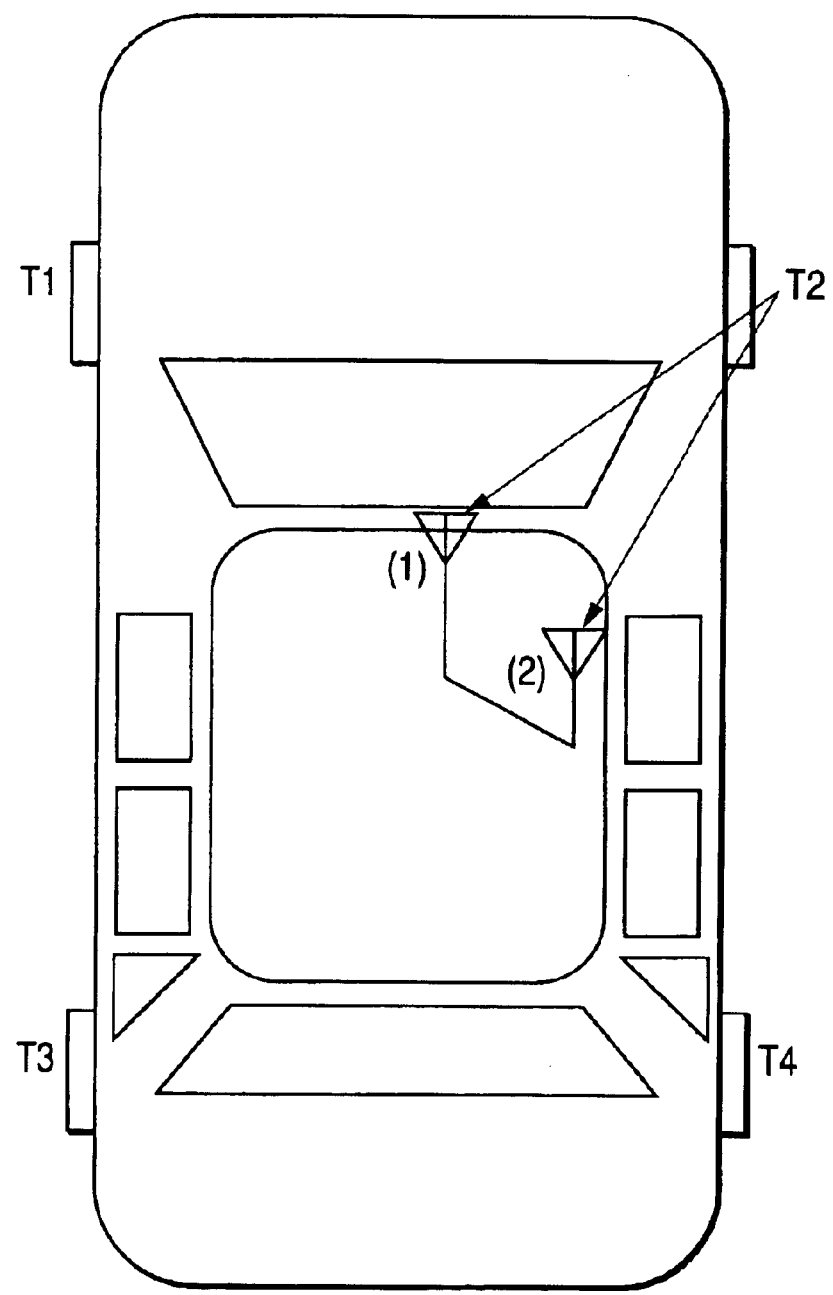
FIG. 6 is an illustration showing a receiving status when the two receiving antennas receive transmitting signals from the tire mounting position T2.
Figure 7:
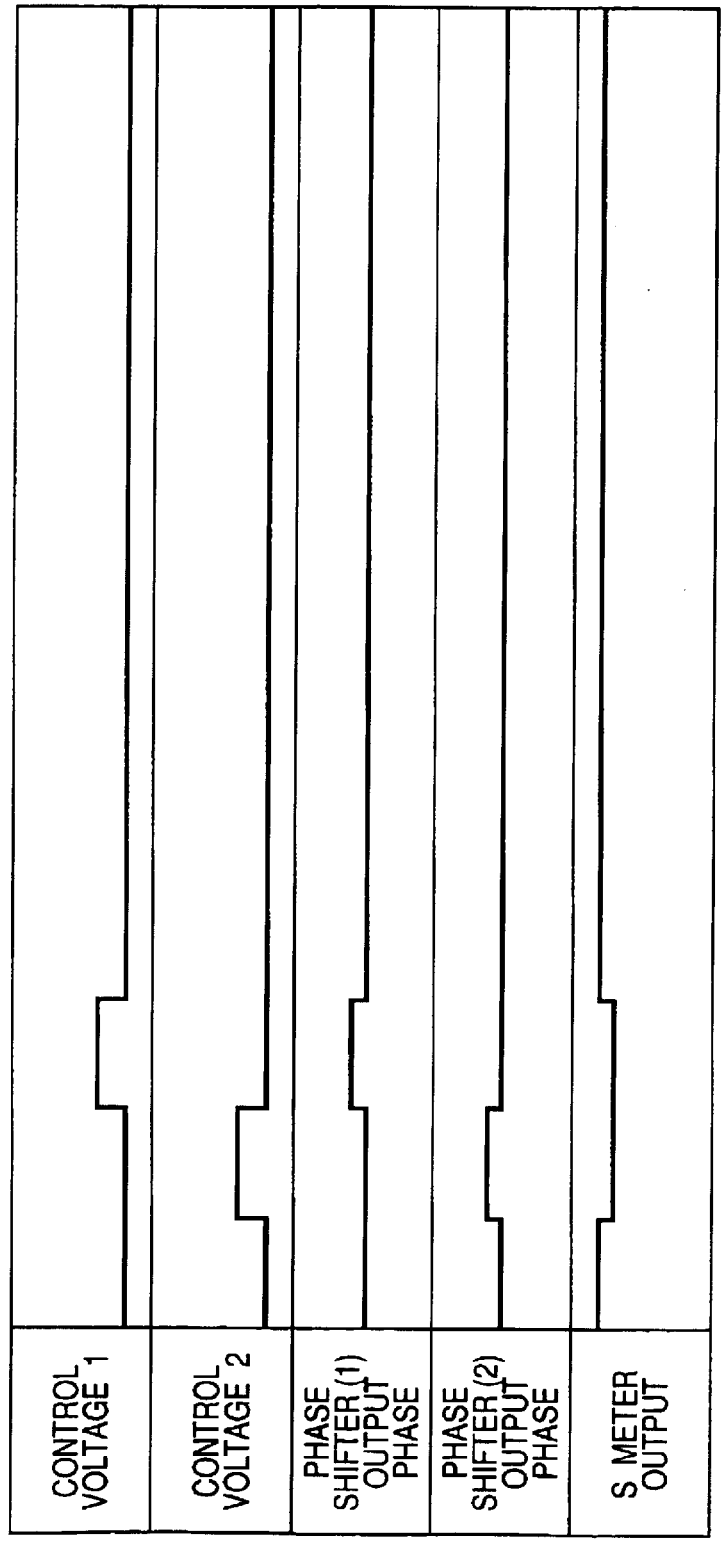
FIG. 7 is a diagram showing signal waveforms of a circuitry for identifying a tire mounting position in the case of signal transmission from the tire mounting position T2.
Figure 8:
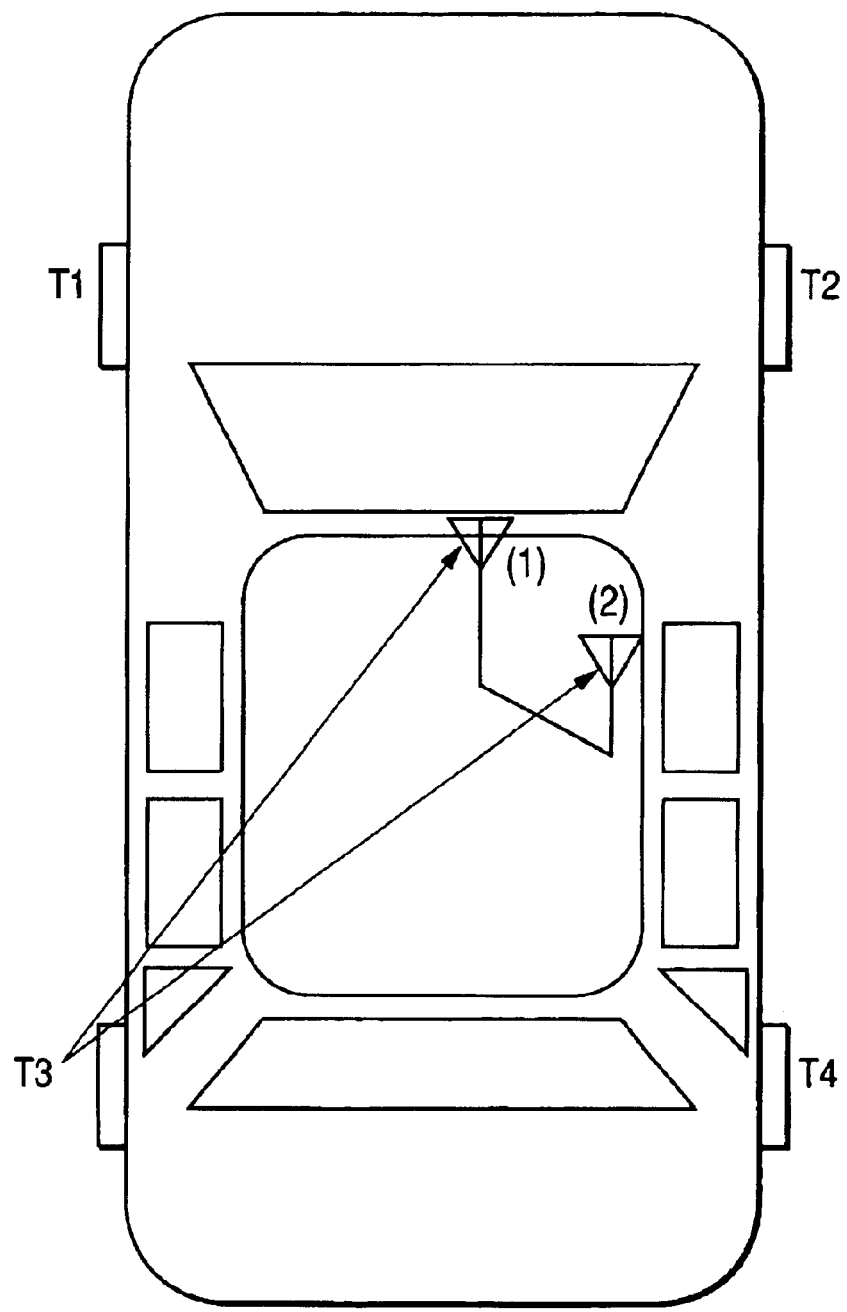
FIG. 8 is an illustration showing a receiving status when the two receiving antennas receive transmitting signals from the tire mounting position T3.
Figure 9:
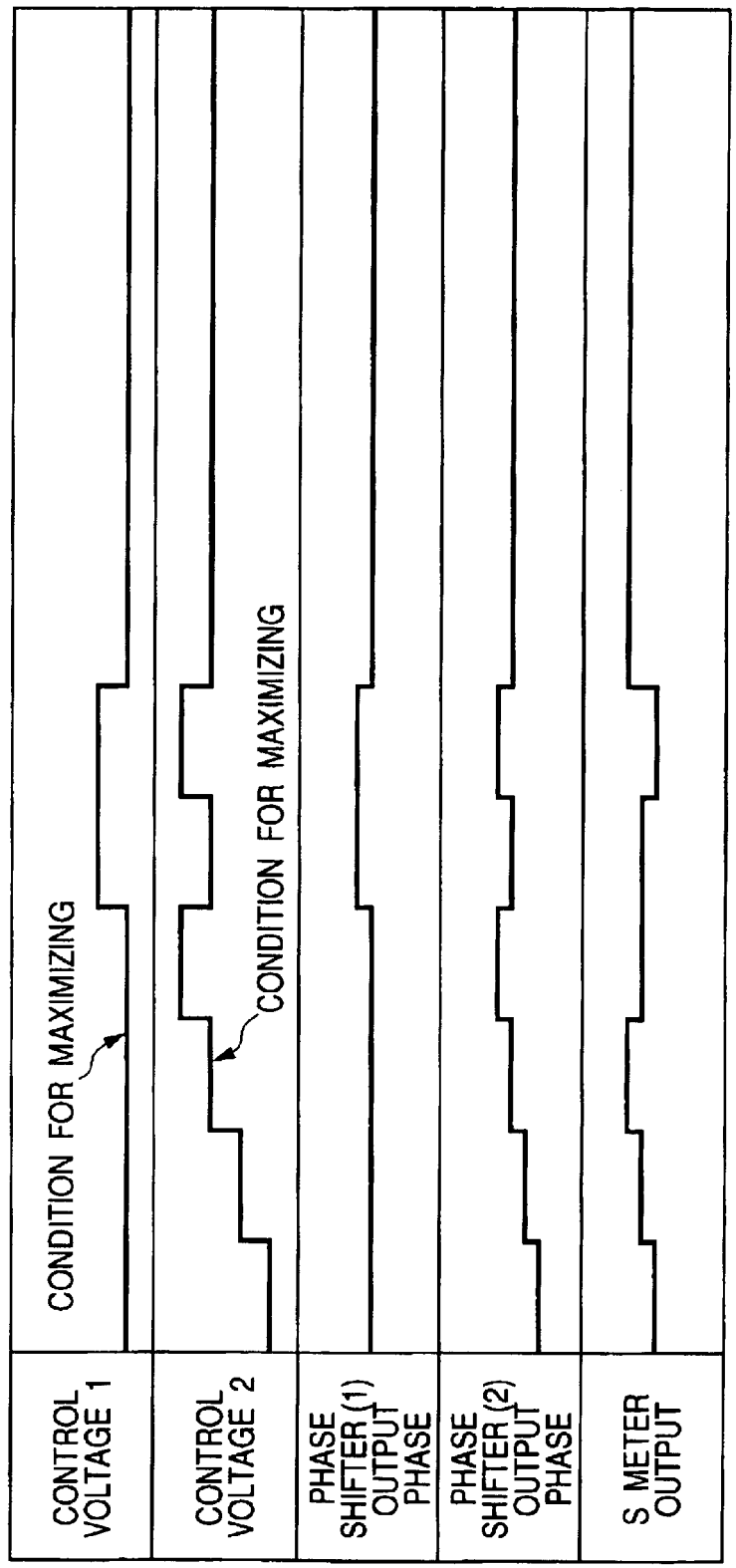
FIG. 9 is a diagram showing signal waveforms of a circuitry for identifying a tire mounting position in the case of signal transmission from the tire mounting position T3.
Figure 10:
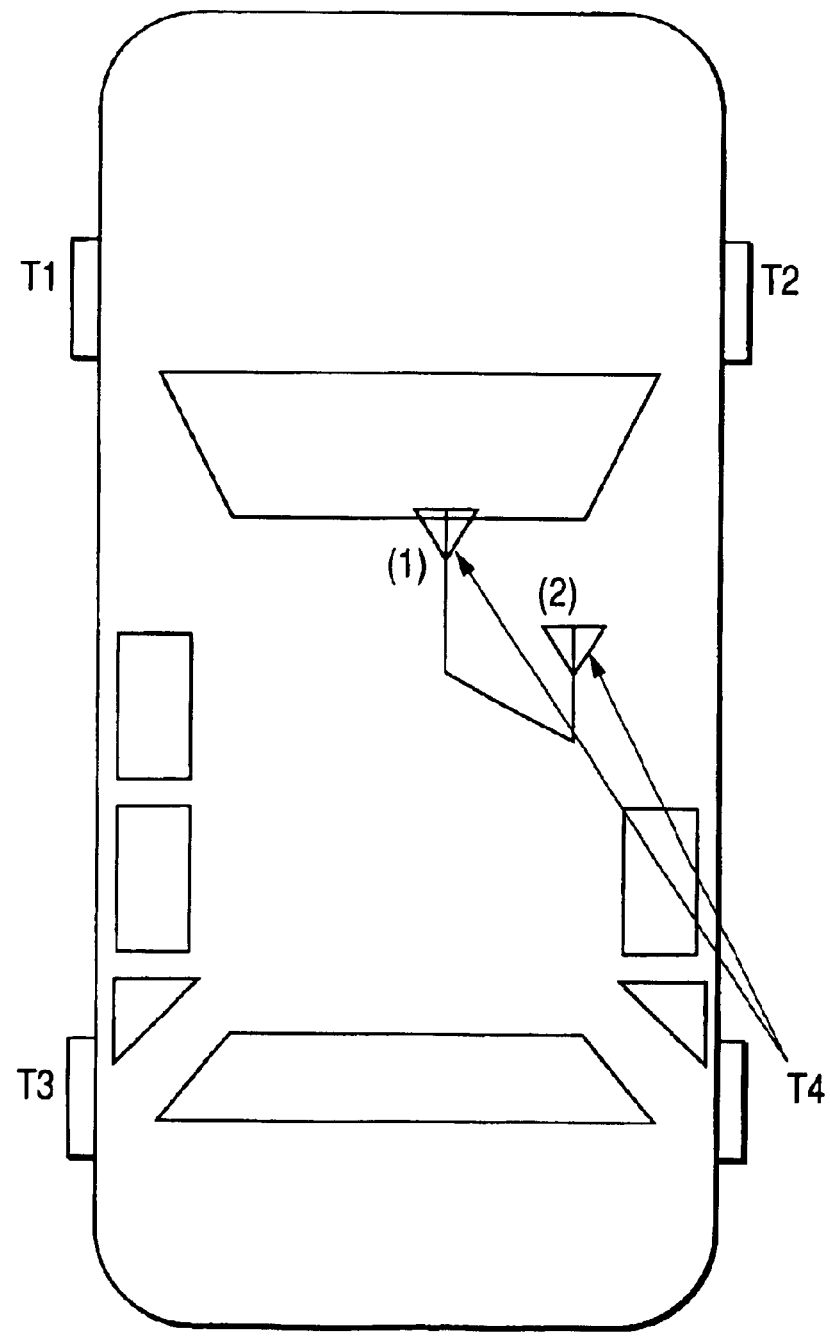
FIG. 10 is an illustration showing a receiving status when the two receiving antennas receive transmitting signals from the tire mounting position T4.
Figure 11:
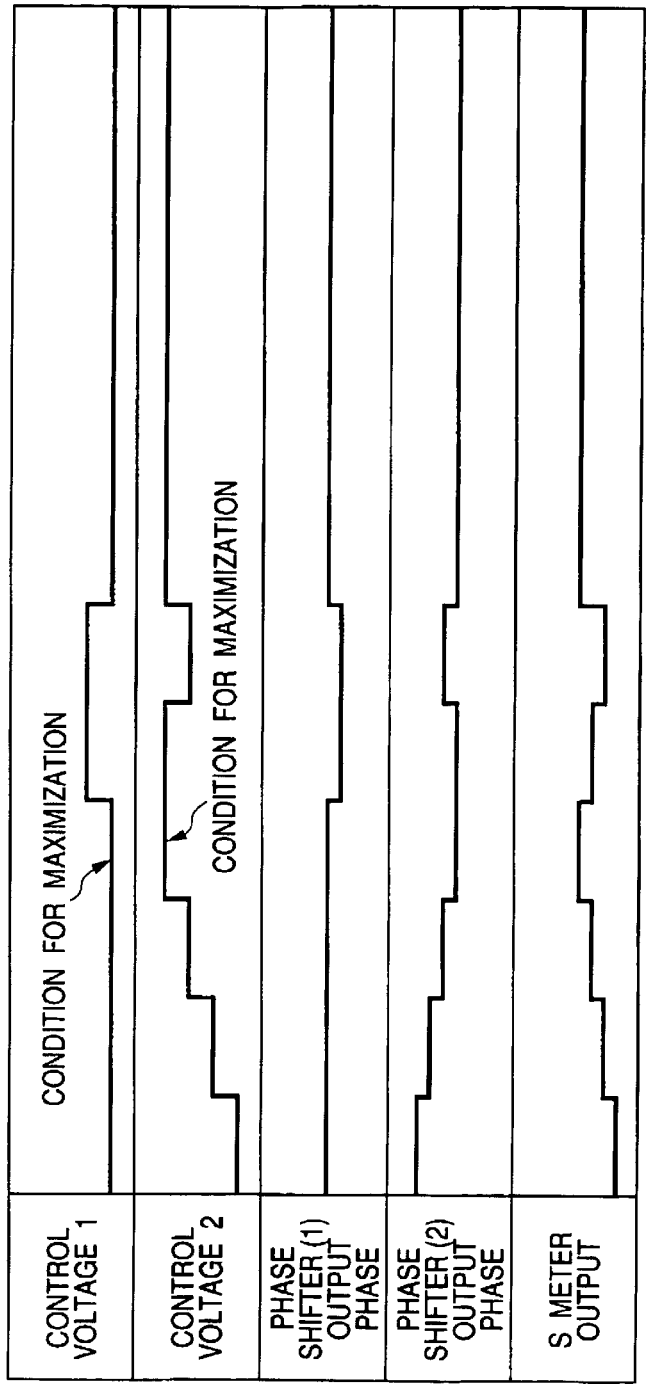
FIG. 11 is a diagram showing signal waveforms of a circuitry for identifying a tire mounting position in the case of signal transmission from the tire mounting position T4.

Further, FIG. 4 is an illustration showing a receiving status when the two receiving antennas receive transmitting signals from the tire mounting position T1. FIG. 5 is a diagram showing signal waveforms of a circuitry for identifying a tire mounting position in the case of signal transmission from the tire mounting position T1. FIG. 6 is an illustration showing a receiving status when the two receiving antennas receive transmitting signals from the tire mounting position T2. FIG. 7 is a diagram showing signal waveforms of the circuitry for identifying a tire mounting position in the case of signal transmission from the tire mounting position T2. FIG. 8 is an illustration showing a receiving status when the two receiving antennas receive transmitting signals from the tire mounting position T3. FIG. 9 is a diagram showing signal waveforms of the circuitry for identifying a tire mounting position in the case of signal transmission from the tire mounting position T3. FIG. 10 is an illustration showing a receiving status when the two receiving antennas receive transmitting signals from the tire mounting position T4. FIG. 11 is a diagram showing signal waveforms of the circuitry for identifying a tire mounting position in the case of signal transmission from the tire mounting position T4.

Figure 12:
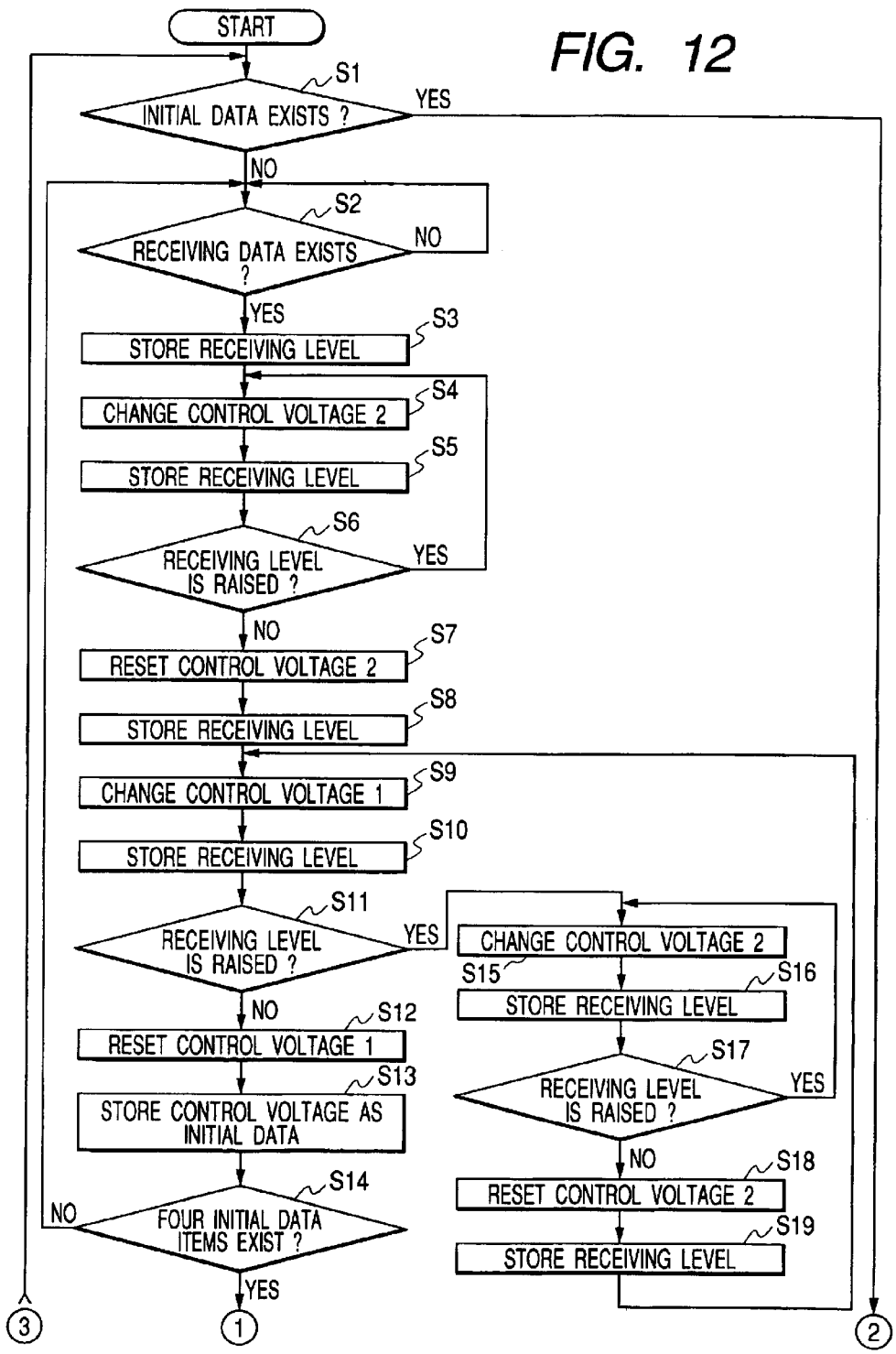
FIG. 12 is a flowchart indicating a specific procedure (1) to identify the tire mounting position relating to the embodiment of the present invention.
Figure 13:
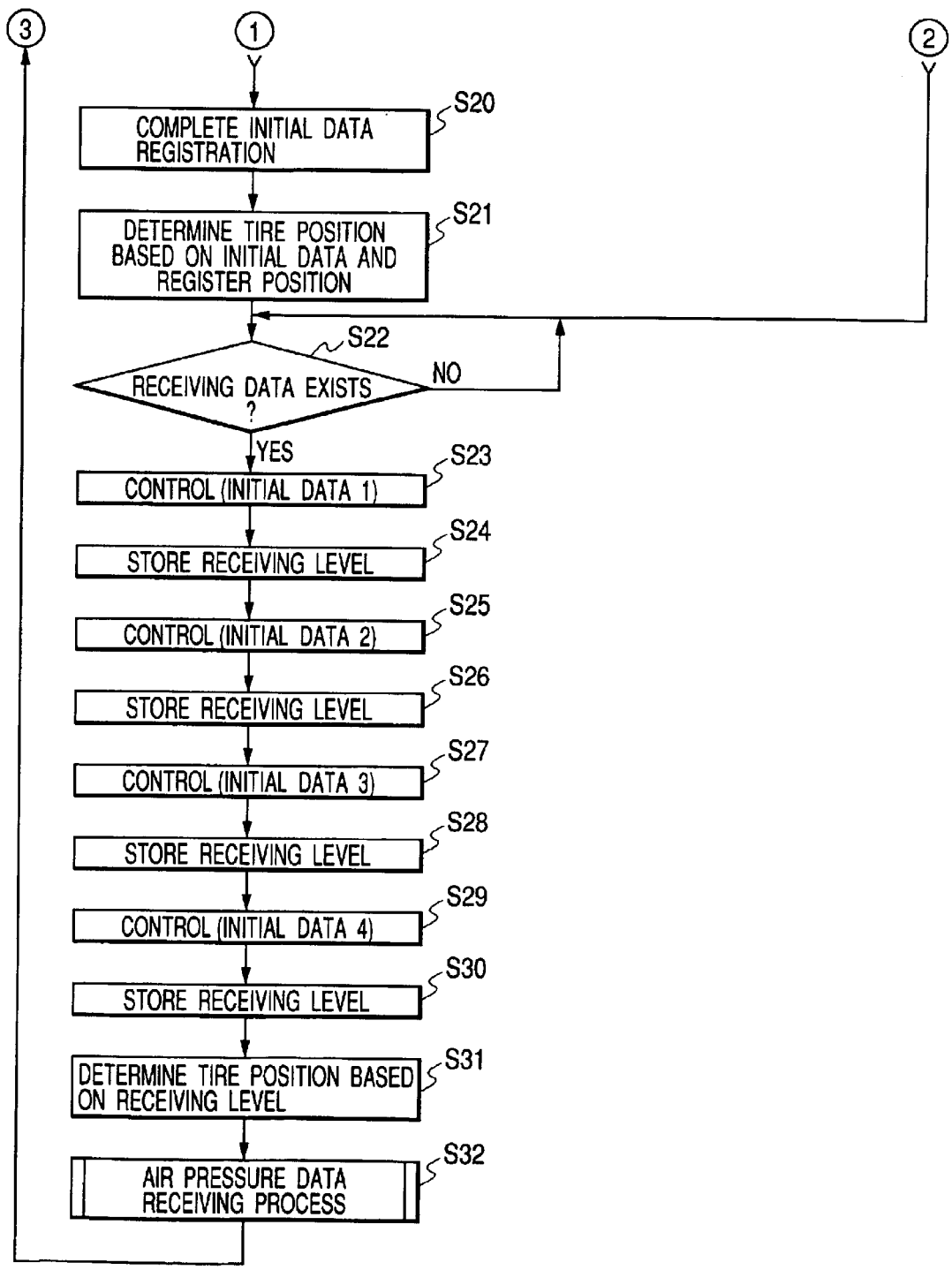
FIG. 13 is a flowchart indicating a specific procedure (2) to identify the tire mounting position relating to the embodiment of the present invention.

Further, FIG. 12 is a flowchart indicating a specific procedure (1) to identify a tire mounting position relating to the embodiment of the present invention. FIG. 13 is a flowchart indicating a specific procedure (2) to identify the tire mounting position relating to the embodiment of the present invention. FIG. 14 is a table which shows for each tire mounting position, a phase difference between the signals inputted in the two receiving antennas and a level of control voltages to maximize a synthesized output.

In the drawings, reference numeral 1 indicates a receiving antenna 1, reference numeral 2 indicates a receiving antenna 2, reference numeral 3 indicates a tire at the tire mounting position T1, reference numeral 4 indicates a tire at the tire mounting position 12, reference numeral 5 indicates a tire at the tire mounting position T3, reference numeral 6 indicates a tire at the tire mounting position T4, reference numeral 10 indicates a first phase shifter, reference numeral 11 indicates a second phase shifter, reference numeral 12 indicates a synthesizer, reference numeral 13 indicates a tuner, reference numeral 14 indicates a controller, reference numeral 15 indicates a storage and reference numeral 20 indicates a varicap.

In the arrangement example as shown in FIG. 1, four tires are respectively mounted on the mounting positions T1, T2, T3 and T4. Tire air pressure sensors and transmitters for transmitting information as to the air pressure detected by the sensor are not illustrated but are annexed to the tires 3, 4, 5, and 6, respectively. On the vehicle, two receiving antennas 1 and 2 are placed at different positions as illustrated. These two receiving antennas 1, 2 independently receive transmitting signals from the transmitters respectively annexed to the four tires 3, 4, 5 and 6. The receiving antennas 1, 2 are arranged such that a phase difference between the signals respectively received by the two receiving antennas from one transmitter is varied for each of the transmitters. In other words, the two receiving antennas 1, 2, which receive transmitting signals from each transmitter of the tire mounting positions T1, 12, 13 and 14, are arranged so that the phase difference between the inputted signals is different by tire mounting position.

FIG. 2 shows a configuration example of a receiver to identify a tire mounting position. Here, phase shifters 10, 11 are respectively connected to the receiving antennas 1, 2 and in the phase shifters, phases are shifted as to the receiving signals respectively from the receiving antennas 1, 2. The shifting amount is determined by a level of the control voltage applied on the phase shifter. The outputs from respective phase shifters are synthesized in the synthesizer 12, and the control voltage is adjusted to maximize the output from the synthesizer (details will be described below). The synthesized output from the synthesizer 12 is inputted in the tuner 13, and from the tuner 13, a data signal and a signal level are outputted. Then, the data signal and the signal level are respectively inputted in the controller 14. Here, the degree of the signal level is detected by an S (Signal) meter or an RSSI (Received Signal Strength Indicator). A table which shows an association between the tire mounting positions and the control voltages 1, 2 as shown in FIG. 14 (described below), is stored in the storage 15. The controller 14 varies and supplies the control voltages 1, 2 respectively to the phase shifters 10, 11, as well as sending/receiving a signal to/from the storage 15.

Moreover, in the present embodiment, the receiving signals from the receiving antennas 1, 2 are synthesized and the control voltages 1, 2 are fixed after various modification, so as to maximize the synthesized output. At this timing, the synthesized output is detected by the S meter or RSSI, and stores the level in the storage 15.

The values of the control voltages 1, 2 to maximize the output from the synthesizer 12 can be determined in advance during the design stage, according to the positional relationship between the receiving antennas 1, 2 and each of the transmitters (each of the tire mounting positions). Also, it is quite conceivable to obtain, by actual measurement, the relationship between the control voltages 1, 2 and each of the transmitters at the tire mounting positions to maximize the synthesized output. Therefore, the relationship between the control voltage value and the transmitter identification is stored in the storage 15 as a table (see FIG. 14). A specific procedure for identifying the tire mounting position with the transmitter will be explained below. In summary, phases of the receiving signals are shifted respectively by the control voltages, so as to maximize the synthesized value of the receiving signals of each of the receiving antennas 1 and 2, and the values of the control voltages at this timing are compared with those in the table in the storage 15, so that it is identified from which transmitter position (tire mounting position) the receiving signals are transmitted.

FIGS. 3A, 3B, 3C show specific examples of the phase shifters 10, 11. In those examples, a phase difference is given between input/output signals by varying capacitance of the varicap by applying the control voltage. FIG. 3A shows a configuration example of the phase shifter, and FIG. 3B shows another example thereof. FIG. 3C shows that the phase difference between input/output signals is varied from −90 degrees to +90 degrees by varying the control voltage.

FIG. 5 shows signal waveforms in the receiver as shown in FIG. 2, in the case where there is a signal transmission from the tire mounting position T1, and shows a process until it is determined that the signal is transmitted from the tire mounting position T1. It is assumed that the receiving antennas 1, 2 as shown in FIG. 4 are arranged so that there is a distance corresponding to half-wave length ($\lambda/2$) therebetween, viewed from the transmitter at the tire mounting position T1. Then, in step (1) of FIG. 5, when the control voltage of the phase shifter is an initial value, a phase deviation width is at the maximum as to the outputted phase shift of the phase shifter 1. That is, since signals deviated by half-wave length from each other are inputted from the transmitter, respectively into the receiving antennas 1 and 2, the phase deviation width is maximized, comparing the case where the signals are in phase. Therefore, when the output from the first phase shifter 10 having the maximum phase deviation width and the output from the second phase shifter 11 are synthesized, the synthesized output, having been detected by the S meter, is small.

Next, in step (2) of FIG. 5, only the control voltage 2 of the second phase shifter 11 is raised by one step to vary the output phase shift of the second phase shifter 11. In this case, when the S meter output is monitored, the output value is lowered. In the present embodiment, a target is to find out a control voltage at which the S meter output indicates a maximum value. Therefore, the control voltage 2 is reset to the initial value, since it has been found that the one step rise of the control voltage 2 does not result in maximizing the synthesized output.

In step (3) of FIG. 5, under the condition that the control voltage 2 is reset to the initial value, the control voltage 1 is raised by one step. Then, the received signal at the receiving antenna 1 is substantially deviated from $\lambda/2$, and the phase deviation width becomes smaller in the output phase shift of the first phase shifter 10 thereby enlarging the S meter output. Further, in step (4), only the control voltage 2 is raised by one step. The S meter output at this timing is monitored and then it is confirmed that the S meter output becomes smaller, so that the control voltage 2 is reset to the initial value.

Subsequently, in step (5), only the control voltage 1 is raised by one step comparing to that of step (1), and monitors the S meter output to confirm that it becomes larger. Further, the control voltage 2 is raised again by one step under the condition of the step (5), to form a condition for step (6). Since the S meter output in step (6) becomes smaller comparing to step (5), the control voltage 2 is reset to the initial value, and then, the control voltage 1 is further raised by one step to form a condition for step (7).

Since the S meter output in step (7) becomes larger than the previous conditions, again, the control voltage 2 is raised by one step to form a condition for step (8). Since the S meter output in step (8) becomes smaller, the control voltage 2 is reset to the initial value. Furthermore, under the condition of step (8), the control voltage 1 is raised by one step to form a condition for step (9). In step (9), it is confirmed that the S meter output becomes smaller than that of step (7). Then, it is found that the S meter becomes at the maximum in step (7), and the control voltages 1, 2 in step (7) are conditions for maximizing the synthesized output from the receiving antennas 1 and 2.

As described above, by repeating up/down variation of the control voltage 2 and rising variation by one step of the control voltage 1, it is possible to obtain each control voltage to maximize the synthesized output from each of the receiving antennas, and based on the value of each control voltage, it is possible to determine from which tire mounting position (transmitter) the signal is transmitted. It is because according to the arrangement of the receiving antennas 1, 2, the control voltages 1, 2 which maximize the transmitting signal from each transmitter by tire mounting position are previously known as predetermined values in the design process. In addition, those values can also be obtained by an actual measurement in advance. Then, a relationship between the aforementioned tire mounting positions and the control voltages is shown in FIG. 14.

As described above, since it is possible in advance to link the identification of each tire mounting position, with the control voltages 1 and 2, a table indicating this relationship as shown in FIG. 14 is stored in the storage 15 in FIG. 2. When detected values of the control voltages 1 and 2 which maximize the aforementioned S meter output are corresponded to values on the table, it is possible to identify each transmitter position of tire, i.e., each tire mounting position.

Next, FIG. 7 shows signal waveforms in the receiver as shown in FIG. 2, in the case where a signal is transmitted from the tire mounting position T2. As seen from the positional relationship between the tire mounting position T2 and the receiving antennas 1, 2 in FIG. 6, the receiving antennas 1, 2 which receive the transmitted signals from the transmitter at the tire mounting position T2 respectively have inputs approximately in phase. A variation of the S meter output while the control voltage is varied will be specifically explained by use of FIG. 7. When only one of the control voltage 1 and the control voltage 2 is raised by one step, the S meter output, i.e., an output from the synthesizer, is lowered in both cases. When the control voltages 1 and 2 are equal, i.e., in the example of FIG. 7, both the control voltages are small, the S meter output becomes large. In the table previously stored in the storage 15 as shown in FIG. 2 (see FIG. 14), only the tire mounting position T2 indicates that both the control voltages 1 and 2 are small. When the control voltages 1, 2 are actually varied according to the function of the controller 14 as shown in FIG. 2 and if both voltages are small, it is determined that the signal transmission comes from the tire mounting position T2.

Next, FIG. 9 shows signal waveforms in the receiver as shown in FIG. 2, in the case where a signal is transmitted from the tire mounting position T3. As seen from the positional relationship between the tire mounting position T3 and the receiving antennas 1, 2 in FIG. 8, the receiving antennas 1, 2 which receive the transmitted signals from the transmitter at the tire mounting position T3 respectively have inputs with "+medium" degree phase difference. The degree of the phase difference can be sufficiently recognized by contrasting with the case of tire mounting position T1, where the distance between the receiving antennas 1 and 2 is half-wave and the phase difference is "+large" (see FIGS. 4 and 5), with the case of tire mounting position T2 of approximately in-phase and the phase difference is "small" (see FIGS. 6 and 7). The S meter output variation while the control voltage is changed is specifically explained by use of FIG. 9, and it will be found that the S meter output becomes at the maximum when the control voltage 1 is "small" and the control voltage 2 is "+medium". In other words, the synthesized value of the receiving antennas is maximized when the control voltage 2 is raised to the third step. Then, according to the controller 14, it is determined that the signal is transmitted from the tire mounting position T3 by contrasting the result with the table as shown in FIG. 14.

Next, FIG. 11 shows signal waveforms in the receiver as shown in FIG. 2, in the case where a signal is transmitted from the tire mounting position T4. As seen from the positional relationship between the tire mounting position T4 and the receiving antennas 1, 2 in FIG. 10, it shows an inverse symmetry relationship comparing to the case of tire mounting position T1 as shown in FIG. 4. In other words, the distance between the receiving antennas 1 and 2 is $\lambda/2$, and the phase difference between the inputs to the receiving antennas 1 and 2 is "−large". The S meter output variation while the control voltage is changed is specifically explained by use of FIG. 11, and it will be found that the S meter output is maximized when the control voltage 1 is "small" and the control voltage 2 is "large". Then, it is determined that the signal is transmitted from the tire mounting position T4, by contrasting the results with the table in FIG. 14.

A specific procedure for identifying a tire mounting position, as described above, will be explained broadly with reference to the flowcharts as shown in FIG. 12 and FIG. 13. In these flowcharts, a procedure is shown until the association table (a table stored in the storage) between the tire mounting positions T1, T2, T3 and T4, and the control voltages 1, 2 is created. Further, a procedure for actually identifying from which tire position a signal is transmitted is also described.

At first, in order to create a table as shown in FIG. 14 by actual measuring, when there is no initial data as to the tire mounting position and the control voltage (S1) and there is receiving data towards the two receiving antennas (S2), a receiving level by the S meter is stored (S3), and the receiving level after the control voltage 2 is varied is stored (S5). Then, it is determined whether or not the receiving level is raised (S6), and if it is not raised, the control voltage 2 is reset to an initial value and the receiving level is stored (S8).

Subsequently, the control voltage 1 is varied, and the receiving level at that timing is stored and it is determined whether or not the receiving level is raised from that of previously stored (S11). If it is raised, the control voltage 2 is varied again (S15), and it is determined whether or not the receiving level is raised (S17). If it is not raised, the control voltage 2 is reset to the initial value (S18). On the other hand, in step 11 (S11), if the receiving level is not raised, the control voltage 1 is reset and it is stored as initial data of any of the tire mounting positions T1, T2, T3 and T4 (S13). With the procedure as described above, it is determined whether or not the receiving level of the S meter is raised by varying one control voltage. If the level is raised by varying one control voltage, the other control voltage is also varied and up/down movement of the receiving level is observed. Then, the control voltages 1 and 2 to maximize the receiving level are fixed and stored as initial data. Such a procedure as described above is carried out for each of the tire mounting positions T1, T2, T3 and T4 (S14). Then, in S20 and S21, a table as shown in FIG. 14 is created.

Subsequently, S23 to S31 of FIG. 13 indicate a procedure after the table is created and stored, i.e., a procedure to identify the mounting position when there is receiving data from any of the tire mounting positions (S22) The procedure from S23 to S31 as described below is a different method from the aforementioned procedure, for example, when both the control voltages 1, 2 in the case of the tire mounting position T2 are raised by one step from the initial value, a tendency of lowering of S meter output in the both voltages is found, and it is determined that this tendency indicates a transmission from the tire mounting position T2.

In step 23 (S23), values of the control voltages 1 and 2 at which the maximum output is obtained at the tire mounting position T1 are applied, and the receiving level of the S meter output level at that timing is stored. Similarly, the control voltages 1 and 2 shown in the table for the case of the tire mounting position T2 are applied in S25 and the receiving level at that timing is stored (S26). And similarly, the control voltages shown in the table in the cases of the mounting positions T3 and T4 are applied and each receiving level is stored.

Then, for example, when a signal is transmitted from the tire mounting position T2, the stored receiving level (S24) of the tire mounting position T1 is small as a matter of course (since the applied voltages are not a condition for obtaining the maximum level). Similarly, the stored receiving levels in S28 and S30 should also be small due to the same reason. On the other hand, only the receiving level stored in S26 becomes large since here the condition of the control voltages corresponds to the condition where the output is maximized. As described above, by detecting the degree of the four receiving levels, it is possible to determine the tire mounting position (S31). With such a determining method as described above, a risk of error in judgment may be reduced, since the four receiving levels are relatively compared, even in the case where an electromagnetic radiating object exists around the vehicle.

It is to be noted that the aforementioned arrangement of two antennas is shown just as an example. It is possible to employ a different arrangement, and in that case, the contents of the table shown in FIG. 14 are also modified.

According to the present invention, it is possible to identify a tire mounting position, with a transmitting signal from a transmitter annexed to a tire, by employing a simple configuration of two receiving antennas using only one-way communication.

Further, in a specific method for identifying the tire mounting position, the tire mounting position is relatively evaluated. Therefore, it is hardly possible that particular reliability is deteriorated in case of the existence of any electromagnetic radiating object.

What is claimed is:

1. A tire air pressure monitor comprising:

tire air pressure sensors and transmitters which are respectively annexed to tires mounted on a vehicle;

two receiving antennas which receive a transmitting signal from each of the transmitters;

phase shifters which shift signal phases received from the receiving antennas respectively by control voltages;

a synthesizer which synthesizes outputs from the phase shifters; and a meter which detects an output level from the synthesizer, wherein, the two receiving antennas are arranged so that receiving phase differences between the two receiving antennas as to the transmitting signal from each of the transmitters are made different, wherein the control voltages for the phase shifters are respectively obtained in advance, which maximize the output level from the synthesizer, as to respective tire mounting positions provided with the transmitters to store an association table relating each of the tire mounting positions to the control voltages, and wherein the control voltages are controlled so that the output level from the synthesizer is maximized with respect to a transmitting signal from any one of the tire mounting positions to identify each of the tire mounting positions by comparing values of the control voltages thus controlled with the association table.

2. A tire air pressure monitor comprising:

tire air pressure sensors and transmitters which are respectively annexed to tires mounted on a vehicle;

two receiving antennas which receive a transmitting signal from each of the transmitters;

phase shifters which shift signal phases received from the receiving antennas respectively by control voltages;

a synthesizer which synthesizes outputs from the phase shifters, and a meter which detects an output level from the synthesizer, wherein, the two receiving antennas are arranged so that receiving phase differences between the two receiving antennas as to the transmitting signal from each of the transmitters are made different, wherein the control voltages for the phase shifters are respectively obtained in advance and stored, which maximize the output level from the synthesizer, as to respective tire mounting positions provided with the transmitters, and wherein the control voltages stored respectively for the tire mounting positions are applied to a transmitting signal from any one of the tire mounting positions, so as to obtain the output level from the synthesizer and to detect a degree of the level, whereby the tire mounting position is identified.

* * * * *